US012670365B2

(12) United States Patent
Kumar et al.

(10) Patent No.: US 12,670,365 B2
(45) Date of Patent: Jun. 30, 2026

(54) METHOD AND SYSTEM FOR MULTI-SENSOR FUSION IN THE PRESENCE OF MISSING AND NOISY LABELS

(71) Applicant: Tata Consultancy Services Limited, Mumbai (IN)

(72) Inventors: Kriti Kumar, Bangalore (IN); Saurabh Sahu, Bangalore (IN); Achanna Anil Kumar, Bangalore (IN); Mariswamy Girish Chandra, Bangalore (IN); Angshul Majumdar, New Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 636 days.

(21) Appl. No.: 18/331,544

(22) Filed: Jun. 8, 2023

(65) Prior Publication Data

US 2023/0401428 A1 Dec. 14, 2023

(30) Foreign Application Priority Data

Jun. 9, 2022 (IN) .............................. 202221033167

(51) Int. Cl.
G06N 3/0455 (2023.01)
F16H 61/12 (2010.01)
(52) U.S. Cl.
CPC ........... G06N 3/0455 (2023.01); F16H 61/12 (2013.01)
(58) Field of Classification Search
CPC .............................. G06N 3/0455; F16H 61/12
See application file for complete search history.

(56) References Cited

U.S. PATENT DOCUMENTS 11,205,103 B2 12/2021 Zhang et al.
2016/0078695 A1 3/2016 McClintic et al.
(Continued)

OTHER PUBLICATIONS

Kumar, K., Sahu, S., Majumdar, A., & Chandra, M. G. (Jul. 2021). Autofuse: A semi-supervised autoencoder based multi-sensor fusion framework. In 2021 International Joint Conference on Neural Networks (IJCNN) (pp. 1-7). IEEE. (Year: 2021).*

(Continued)

*Primary Examiner* — James T Tsai
(74) *Attorney, Agent, or Firm* — Finnegan, Henderson, Farabow, Garrett & Dunner, LLP

(57) ABSTRACT

This disclosure relates to a method and system for multi-sensor fusion in the presence of missing and noisy labels. Prior methods for multi-sensor fusion do not estimate and correct labels for learning effective models in semi-supervised learning methods. Embodiments of the present disclosure provides a method for learning robust sensor-specific autoencoder based fusion model by utilizing a graph structure to perform label propagation and correction. In the disclosed Graph regularized AutoFuse (GAF) method latent representation for each sensor is learnt using the sensor-specific autoencoders. Further these latent representations are combined and fed to a classifier for multi-class classification. The disclosure presents a joint optimization formulation for multi-sensor fusion where label propagation and correction, sensor-specific learning and classification are executed together.

15 Claims, 6 Drawing Sheets

(56) References Cited

U.S. PATENT DOCUMENTS

| | | | |
|---|---|---|---|
| 2019/0205785 A1* | 7/2019 | Volk .......................... | G06N 5/04 |
| 2022/0138503 A1* | 5/2022 | Bandyopadhyay .......................... | |
| | | | G06F 18/2148 |
| | | | 706/12 |

OTHER PUBLICATIONS

Dong, B., Hou, J., Lu, Y., & Zhang, Z. (2019). Distillation $\approx$ Early Stopping? Harvesting Dark Knowledge Utilizing Anisotropic Information Retrieval For Overparameterized Neural Network. arXiv preprint arXiv:1910.01255. (Year: 2019).*

EPO Search Opinion, App. EP23177434, Oct. 27, 2023. (Year: 2023).*

Protopapadakis, Eftychios et al., "Stacked Autoencoders Driven by Semi-Supervised Learning for Building Extraction from near Infrared Remote Sensing Imagery", Title of the item: Remote Sensing, Date: Jan. 2021, vol. 13; Issue: 3, Publisher: MDPI, Link: https://www.mdpi.com/2072-4292/13/3/371.

Sae-Ang, Bee-Ing et al., "Semi-Supervised Learning for Defect Segmentation with Autoencoder Auxiliary Module", Title of the item: Sensors, Date: Apr. 2022, vol. 22; Issue: 8, Publisher: MDPI, Link: https://www.mdpi.com/1424-8220/22/8/2915/htm.

* cited by examiner

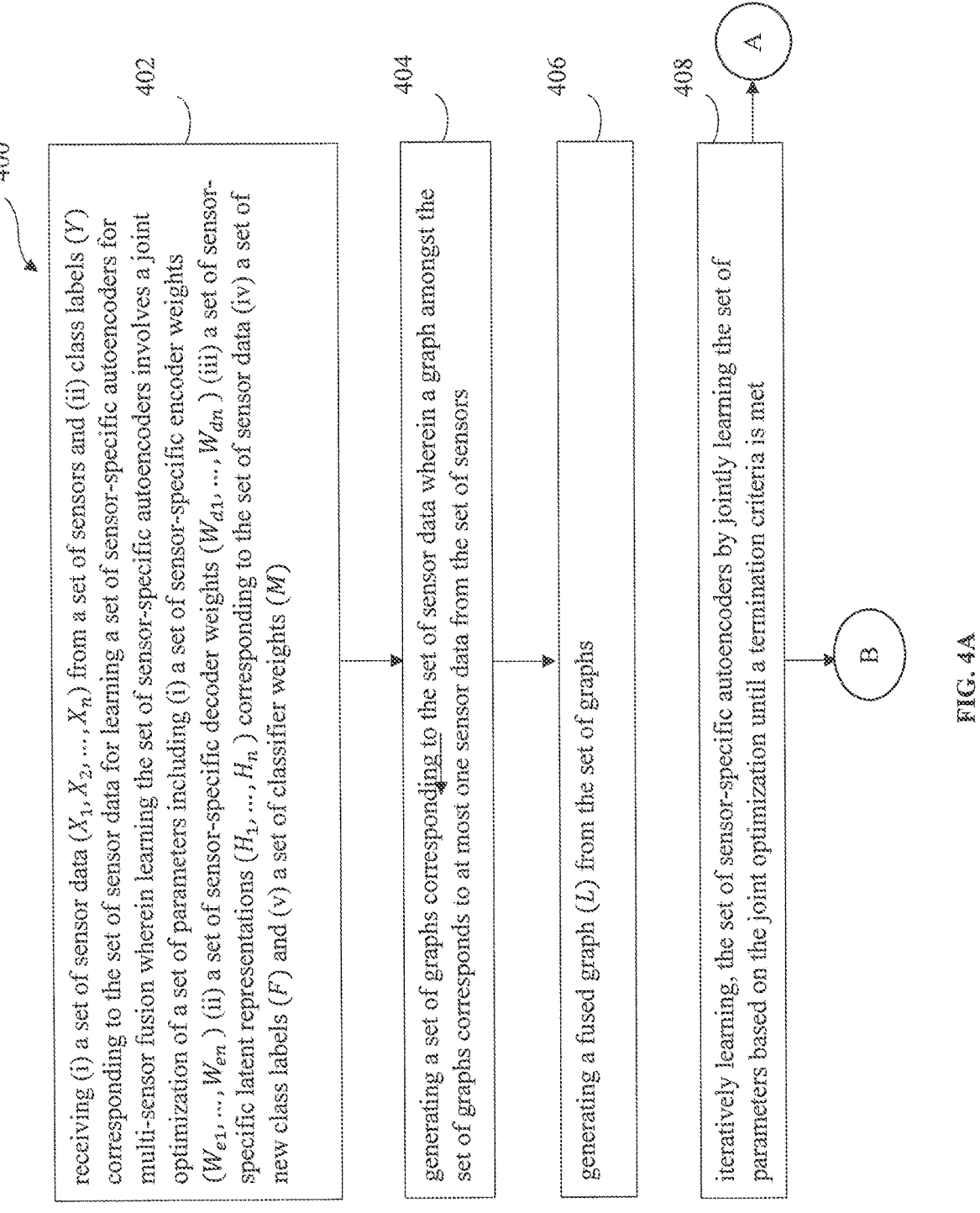

400

402 receiving (i) a set of sensor data $(X_1, X_2, ..., X_n)$ from a set of sensors and (ii) class labels $(Y)$ corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights $(W_{e1}, ..., W_{en})$ (ii) a set of sensor-specific decoder weights $(W_{d1}, ..., W_{dn})$ (iii) a set of sensor-specific latent representations $(H_1, ..., H_n)$ corresponding to the set of sensor data (iv) a set of new class labels $(F)$ and (v) a set of classifier weights $(M)$

404 generating a set of graphs corresponding to the set of sensor data wherein a graph amongst the set of graphs corresponds to at most one sensor data from the set of sensors

406 generating a fused graph $(L)$ from the set of graphs

408 iteratively learning, the set of sensor-specific autoencoders by jointly learning the set of parameters based on the joint optimization until a termination criteria is met

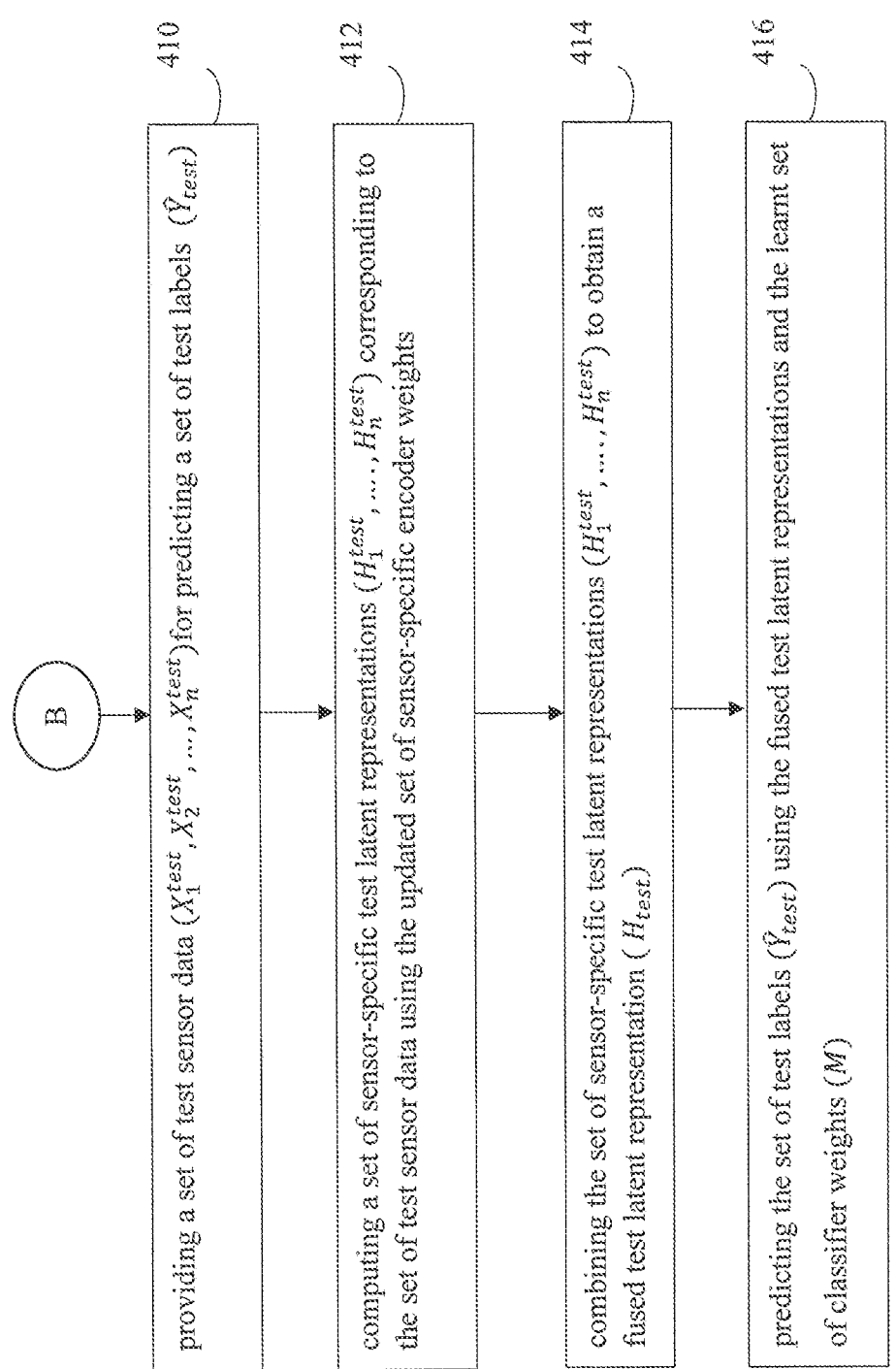

410 providing a set of test sensor data ($X_1^{test}, X_2^{test}, \ldots, X_n^{test}$) for predicting a set of test labels ($\hat{Y}_{test}$)

412 computing a set of sensor-specific test latent representations ($H_1^{test}, \ldots, H_n^{test}$) corresponding to the set of test sensor data using the updated set of sensor-specific encoder weights 414 combining the set of sensor-specific test latent representations ($H_1^{test}, \ldots, H_n^{test}$) to obtain a fused test latent representation ($H_{test}$)

416 predicting the set of test labels ($\hat{Y}_{test}$) using the fused test latent representations and the learnt set of classifier weights ($M$)

FIG. 4B

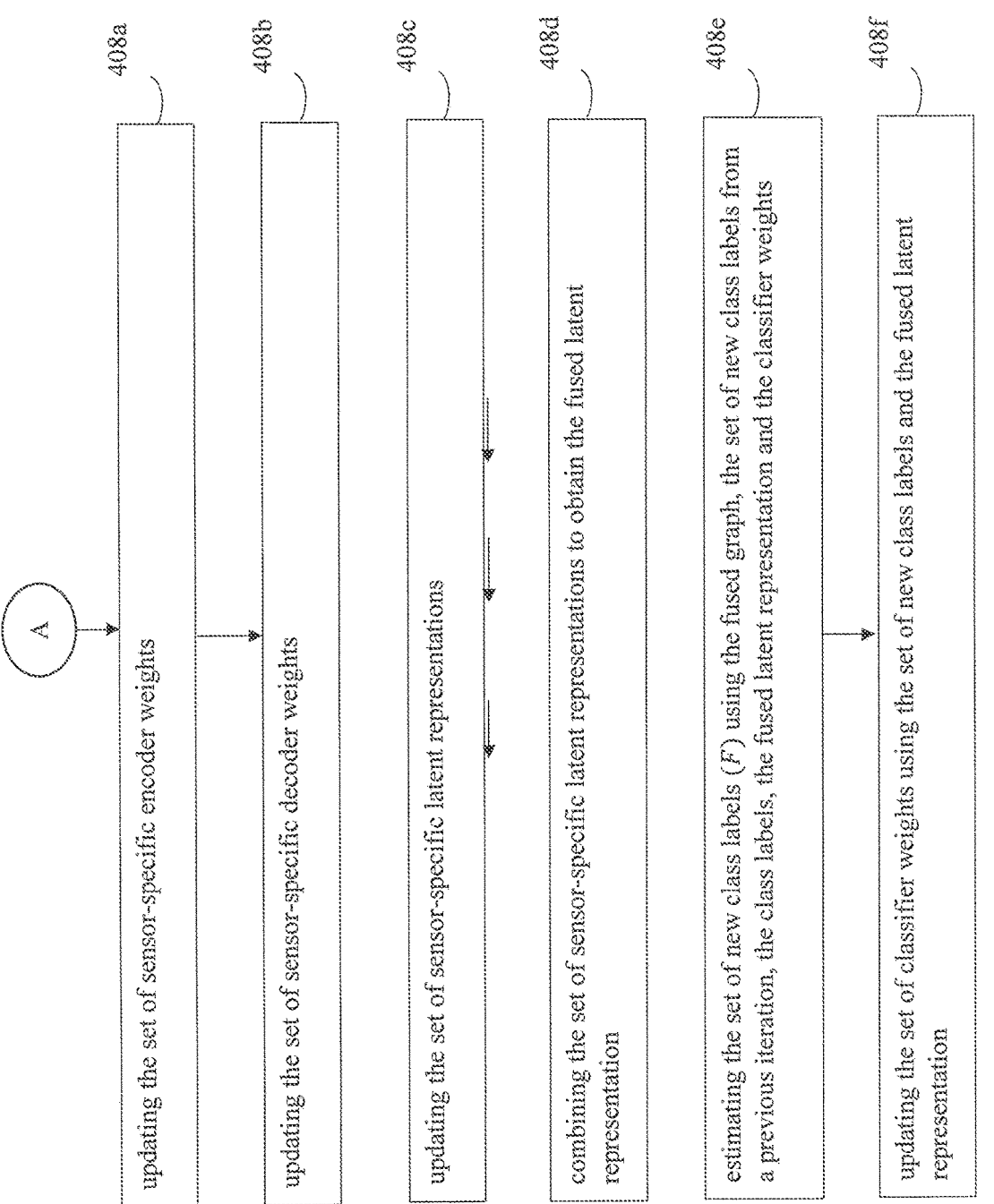

A 408a updating the set of sensor-specific encoder weights 408b updating the set of sensor-specific decoder weights 408c updating the set of sensor-specific latent representations 408d combining the set of sensor-specific latent representations to obtain the fused latent representation 408e estimating the set of new class labels ($F$) using the fused graph, the set of new class labels from a previous iteration, the class labels, the fused latent representation and the classifier weights 408f updating the set of classifier weights using the set of new class labels and the fused latent representation

FIG. 4C

METHOD AND SYSTEM FOR MULTI-SENSOR FUSION IN THE PRESENCE OF MISSING AND NOISY LABELS

PRIORITY CLAIM

This U.S. patent application claims priority under 35 U.S.C. § 119 to: Indian Patent Application No. 202221033167, filed on Jun. 9, 2022. The entire contents of the aforementioned application are incorporated herein by reference.

TECHNICAL FIELD

The disclosure herein generally relates to the field of multi-sensor fusion, and, more particularly, to a method and system for multi-sensor fusion in the presence of missing and noisy labels.

BACKGROUND

Multi-sensor fusion is the process of combining data derived from multiple sensor sources. In recent years, multi-sensor fusion has gained a lot attention in many fields such as fault diagnosis, human health monitoring, remote sensing, medical diagnosis, target recognition, tracking and so on. It has been motivated by the fact that multiple sensor based techniques offer more robust and accurate inference over existing single sensor based techniques. A single sensor based technique is unable to omit the fuzziness and uncertainties of input data to obtain more accurate and acceptable results. Hence, it is beneficial to develop algorithms which combines the data from multiple sensors to achieve better accuracy. Due to this aspect, machine learning models have been widely used for the outstanding performance of multi-sensor based techniques.

In general, training set plays an important role for machine learning models and the successful implementation of these models require a huge training data set. However, the manual labeling of such huge training data set is often a lengthy, tedious and expensive process. For some specific datasets, such as the labeling for the biological domain datasets require expertise of individuals. Therefore, it is infeasible to get all the labels.

Semi-supervised learning methods are utilized to solve the problem of insufficient labels information. These learning methods use the unlabeled data to improve the classification accuracy at much lower cost. Recently, autoencoder based methods have been applied for semi-supervised learning as well as multi-sensor fusion. In one prior method, a semi-supervised Hybrid Classification Autoencoder (HCAE) architecture is used for fault diagnosis in rotating machinery. Deep convolutional autoencoder is used for training and the middle layer of this autoencoder is connected to the SoftMax classifier. Another autoencoder based semi-supervised method utilizes stacked sparse autoencoder for network traffic classification. In another prior method a two-layer sparse autoencoder is used to fuse time and frequency domain features, and then a deep belief network is utilized for bearing fault classification. All the aforesaid techniques are unable to carry out semi-supervised learning and multi-sensor fusion in a unified framework. Also, they are not capable of handling noisy and missing labels that is prevalent in most practical application scenarios. Specially in the case of data limited scenario, where the labels are few and that too corrupted by noise, there is a need to estimate and correct the labels for learning effective models.

SUMMARY

Embodiments of the present disclosure present technological improvements as solutions to one or more of the above-mentioned technical problems recognized by the inventors in conventional systems. For example, in one embodiment, a method for multi-sensor fusion in the presence of missing and noisy labels is provided. The method includes: receiving (i) a set of sensor data $(X_1, X_2, \ldots, X_n)$ from a set of sensors and (ii) class labels (Y) corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights $(W_{e1}, \ldots, W_{en})$ (ii) a set of sensor-specific decoder weights $(W_{d1}, \ldots, W_{dn})$ (iii) a set of sensor-specific latent representations $(H_1, \ldots, H_n)$ corresponding to the set of sensor data (iv) a set of new class labels (F) and (v) a set of classifier weights (M), wherein the class labels are one or more of partially labelled and noisy labelled; generating a set of graphs corresponding to the set of sensor data wherein a graph amongst the set of graphs corresponds to at most one sensor data from the set of sensors; generating a fused graph (L) from the set of graphs; iteratively learning the set of sensor-specific autoencoders by jointly learning the set of parameters based on the joint optimization until a termination criteria is met, the learning comprises: updating the set of sensor-specific encoder weights, updating the set of sensor-specific decoder weights, updating the set of sensor-specific latent representations, combining the set of sensor-specific latent representations to obtain the fused latent representation, estimating the set of new class labels (F) using the fused graph, the set of new class labels from a previous iteration, the class labels, the fused latent representation and the classifier weights, updating the set of classifier weights using the set of new class labels and the fused latent representation; providing a set of test sensor data $$(X_1^{test}, X_2^{test}, \ldots, X_n^{test})$$

for predicting a set of test labels $(\hat{Y}_{test})$; computing a set of sensor-specific test latent representations $$(H_1^{test}, \ldots, H_n^{test})$$

corresponding to the set of test sensor data using the updated set of sensor-specific encoder weights; combining the set of sensor-specific test latent representations $$(H_1^{test}, \ldots, H_n^{test})$$

to obtain a fused test latent representation $(H_{test})$; and predicting the set of test labels $(\hat{Y}_{test})$ using the fused test latent representations and the learnt set of classifier weights (M).

In another aspect, a system for multi-sensor fusion in the presence of missing and noisy labels. The system comprises memory storing instructions; one or more communication interfaces; and one or more hardware processors coupled to the memory via the one or more communication interfaces, wherein the one or more hardware processors are configured by the instructions to receive (i) a set of sensor data ($X_1$, $X_2$, . . . ,$X_n$) from a set of sensors and (ii) class labels (Y) corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights ($W_{e1}$, . . . , $W_{en}$) (ii) a set of sensor-specific decoder weights ($W_{d1}$, . . . , $W_{dn}$) (iii) a set of sensor-specific latent representations ($H_1$, . . . , $H_n$) corresponding to the set of sensor data (iv) a set of new class labels (F) and (v) a set of classifier weights (M), wherein the class labels are one or more of partially labelled and noisy labelled; generate a set of graphs corresponding to the set of sensor data wherein a graph amongst the set of graphs corresponds to at most one sensor data from the set of sensors; generate a fused graph (L) from the set of graphs; iteratively learn the set of sensor-specific autoencoders by jointly learning the set of parameters based on the joint optimization until a termination criteria is met, the learning comprises: updating the set of sensor-specific encoder weights, updating the set of sensor-specific decoder weights, updating the set of sensor-specific latent representations, combining the set of sensor-specific latent representations to obtain the fused latent representation, estimating the set of new class labels (F) using the fused graph, the set of new class labels from a previous iteration, the class labels, the fused latent representation and the classifier weights, updating the set of classifier weights using the set of new class labels and the fused latent representation; provide a set of test sensor data $$(X_1^{test}, X_2^{test}, \ldots, X_n^{test})$$

for predicting a set of test labels ($\hat{Y}_{test}$); compute a set of sensor-specific test latent representations $$(H_1^{test}, \ldots, H_n^{test})$$

corresponding to the set of test sensor data using the updated set of sensor-specific encoder weights; combine the set of sensor-specific test latent representations $$(H_1^{test}, \ldots, H_n^{test})$$

to obtain a fused test latent representation ($H_{test}$); and predict the set of test labels ($\hat{Y}_{test}$) using the fused test latent representations and the learnt set of classifier weights (M).

In an embodiment, wherein estimating the set of new class labels in the first iteration utilizes the fused graph and the class labels.

In an embodiment, wherein the joint optimization is represented as, $$\min_{W_{d1},\ldots,W_{dn},W_{e1},\ldots,W_{en},H_1,\ldots,H_n,M,F} \|X_1 - W_{d1}H_1\|_F^2 +$$
$$\|W_{e1}X_1 - H_1\|_F^2 + \cdots + \|X_n - W_{dn}H_n\|_F^2 + \|W_{en}X_n - H_n\|_F^2 +$$
$$\alpha Tr\left(FLF^T\right) + \beta Tr\left((F - Y)U(F - Y)^T\right) + \lambda\|F - MH\|_F^2$$

such that $H_1 \geq 0$, . . . , $H_n \geq 0$, where $\alpha$, $\beta$ and $\lambda$ are real positive number parameters, U is a diagonal matrix with $U_{jj} = 1$ when the $j^{th}$ measurement of the set of sensor data is labelled else $U_{jj} = 0$.

In an embodiment, wherein updating the set of sensor-specific encoder weights ($W_{e1}$) is represented as, $$W_{ei} \leftarrow \min_{W_{ei}}\|W_{ei}X_i - H_i\|_F^2$$

wherein i=1,2, . . . , n

In an embodiment, wherein updating the set of sensor-specific decoder weights ($W_{di}$) is represented as, $$W_{di} \leftarrow \min_{W_{di}}\|X_i - W_{di}H_i\|_F^2$$

In an embodiment, wherein updating the set of sensor-specific latent representations is represented as, $$H_i \leftarrow \min_{H_i}\|X_i - W_{di}H_i\|_F^2 + \|W_{ei}X_i - H_i\|_F^2 + \lambda\left\|F - \left(M_iH_i + \sum_{z=1,z\neq i}^{n} M_zH_z\right)\right\|_F^2$$

such that $H_i \geq 0$

In an embodiment, wherein obtaining the fused latent representation (H) is based on concatenating the set of sensor-specific latent representations.

In an embodiment, wherein estimating the new class labels (F) is represented as, $$F \leftarrow \min_{F}\alpha Tr\left(FLF^T\right) + \beta Tr\left((F - Y)U(F - Y)^T + \lambda\|F - MH\|_F^2\right)$$

In an embodiment, wherein updating the set of classifier weights (M) is represented as, $$M \leftarrow \min_{M}\lambda\|F - MH\|_F^2$$

In an embodiment, wherein the termination criteria is convergence of a loss function associated with the joint optimization within an empirically determined threshold value.

In yet another aspect, there is provided a computer program product comprising a non-transitory computer readable medium having a computer readable program embodied therein, wherein the computer readable program, when executed on a computing device causes the computing device for multi-sensor fusion in the presence of missing and noisy labels by receiving (i) a set of sensor data ($X_1$, $X_2$, . . . ,$X_n$) from a set of sensors and (ii) class labels (Y)

corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights ($W_{e1}, \ldots, W_{en}$) (ii) a set of sensor-specific decoder weights ($W_{d1}, \ldots, W_{dn}$) (iii) a set of sensor-specific latent representations ($H_1, \ldots, H_n$) corresponding to the set of sensor data (iv) a set of new class labels (F) and (v) a set of classifier weights (M), wherein the class labels are one or more of partially labelled and noisy labelled; generating a set of graphs corresponding to the set of sensor data wherein a graph amongst the set of graphs corresponds to at most one sensor data from the set of sensors; generating a fused graph (L) from the set of graphs; iteratively learning the set of sensor-specific autoencoders by jointly learning the set of parameters based on the joint optimization until a termination criteria is met, the learning comprises: updating the set of sensor-specific encoder weights, updating the set of sensor-specific decoder weights, updating the set of sensor-specific latent representations, combining the set of sensor-specific latent representations to obtain the fused latent representation, estimating the set of new class labels (F) using the fused graph, the set of new class labels from a previous iteration, the class labels, the fused latent representation and the classifier weights, updating the set of classifier weights using the set of new class labels and the fused latent representation; providing a set of test sensor data $$(X_1^{test}, X_2^{test}, \ldots, X_n^{test})$$

for predicting a set of test labels ($\hat{Y}_{test}$); computing a set of sensor-specific test latent representations $$(H_1^{test}, \ldots, H_n^{test})$$

corresponding to the set of test sensor data using the updated set of sensor-specific encoder weights; combining the set of sensor-specific test latent representations $$(H_1^{test}, \ldots, H_n^{test})$$

to obtain a fused test latent representation ($H_{test}$); and predicting the set of test labels ($\hat{Y}_{test}$) using the fused test latent representations and the learnt set of classifier weights (M).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4A-4C is an exemplary flow diagram illustrating the method for multi-sensor fusion in the presence of missing and noisy labels in accordance with some embodiments of the present disclosure.

DETAILED DESCRIPTION

Figure 1:
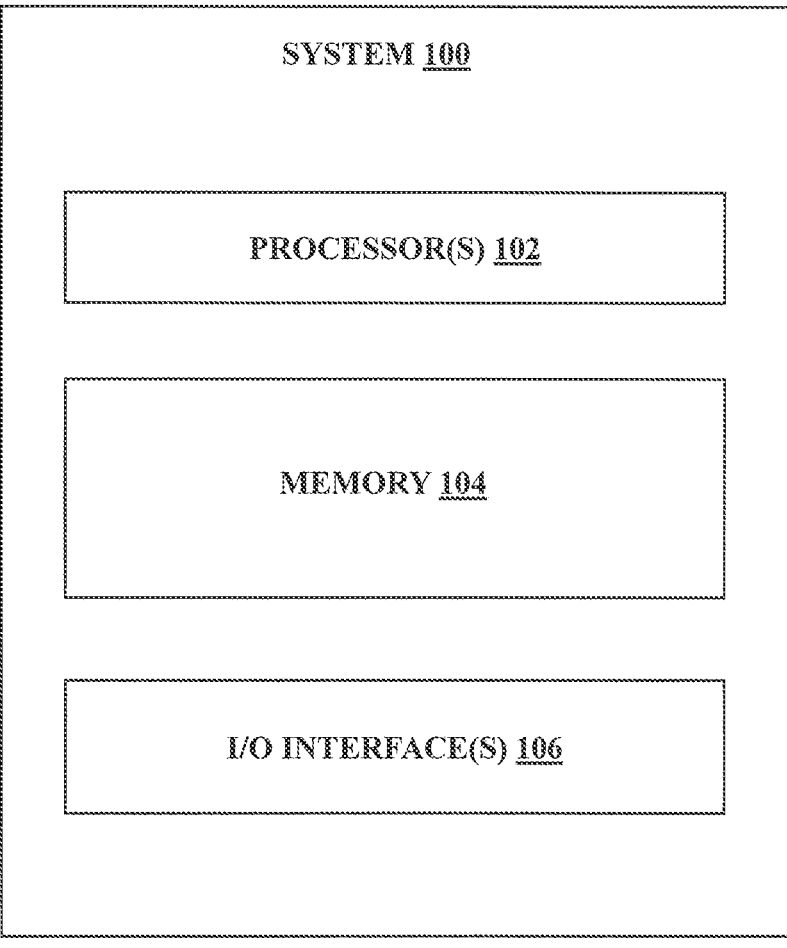
FIG. 1 illustrates an exemplary block diagram of a system for multi-sensor fusion in the presence of missing and noisy labels, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Semi-supervised learning methods are utilized to solve the problem of insufficient labels information. These learning methods use the unlabeled data to improve the classification accuracy at much lower cost. Graph based semi-supervised learning is a well-known semi-supervised learning technique wherein the data found in high dimension space always lies in low-dimension manifold and the graph structure helps in to learn this low-dimensional manifold of sensor data effectively. In the graph structure used for semi-supervised learning, each data point is represented by vertex and these vertices are connected by weighted edge which reflect the similarity between them. The graph based methods considers label propagation over graph to estimate the labels. Since the performance of graph based semi-supervised learning depends heavily on graph, different graph construction methods have been explored extensively. However, the graph construction methods do not directly address the noisy labels in the data. The accuracy of corresponding semi-supervised leaning methods is impacted by these noisy labels. Another prior method uses a graph syndrome technique for noise removal where the disturbance at each node of graph is estimated by stop-band region of graph Fourier spectrum. However, this prior method does not consider information fusion from multiple sensors for label correction. The disclosed method herein referred as Graph regularized AutoFuse (GAF) method handles the problem of insufficient label information and noisy labels for multi-sensor fusion in an efficient manner. The disclosed method utilizes the joint optimization formulation for sensor-specific learning and classification, label propagation and correction wherein the hyperparameter is used to control the tradeoff between the graph structural information and known label information. In the disclosed GAF method, latent representation for each sensor is learnt using sensor-specific autoencoders. Subsequently, these latent representations from different sensors are combined and fed to a label consistent classifier for multi-class classification. A joint optimization formulation for multi-sensor fusion is disclosed where the procedure of label propagation and correction, sensor-specific learning and classification are executed together.

Referring now to the drawings, and more particularly to FIG. 1 through FIG. 4C, where similar reference characters denote corresponding features consistently throughout the figures, there are shown preferred embodiments and these embodiments are described in the context of the following exemplary system and/or method.

FIG. 1 illustrates an exemplary block diagram of a system 100 is configured to perform multi-sensor fusion in the presence of missing and noisy labels, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
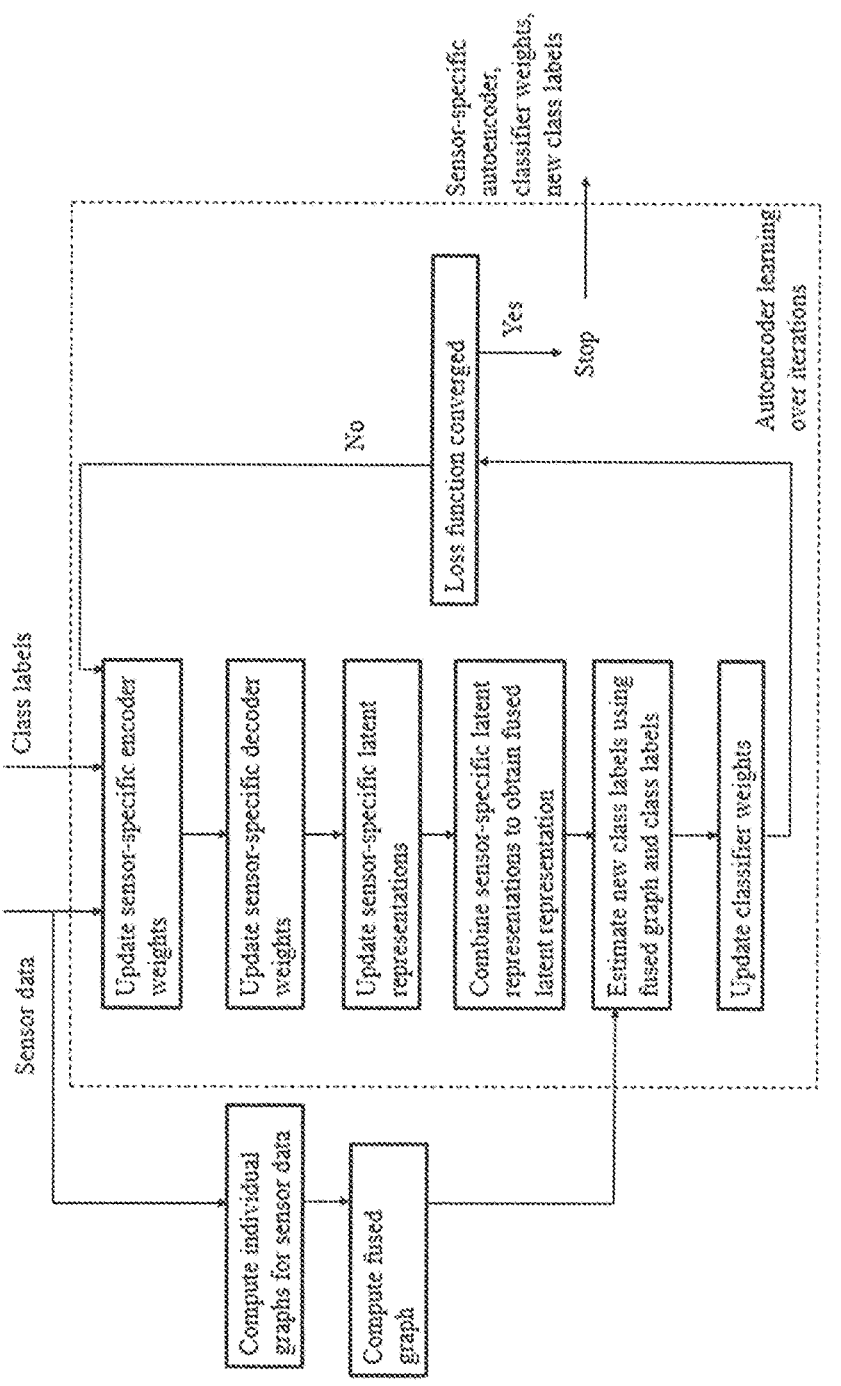
FIG. 2 is an exemplary block diagram illustrating a training phase of the system for multi-sensor fusion in the presence of missing and noisy labels, in accordance with some embodiments of the present disclosure.

FIG. 2 is an exemplary block diagram illustrating a training phase of the system 100 for multi-sensor fusion in the presence of missing and noisy labels, in accordance with some embodiments of the present disclosure. In the training phase, a set of sensor-specific autoencoders is learnt over iterations for predicting class labels. Autoencoders are self-supervised feed forward neural networks that are used to learn a low dimensional embedding from the data with the help of encoders and decoders. The low dimensional embedding or latent representations learnt are used as features for training classifiers or regressors for predictive analytics. The learning of the set of sensor-specific autoencoders involves a joint optimization formulation using data obtained from sensors and class labels which may be noisy or unknown. Over the iterations, a set of parameters such as sensor-specific encoder weights, sensor-specific decoder weights, sensor-specific latent representations, new class labels and classifier weights are learnt. Individual graphs for each sensor data are generated and further all the graphs are fused. The new class labels are estimated using the fused graph. The set of sensor-specific autoencoders is learnt till a loss function associated with the joint optimization is converged.

Figure 3:
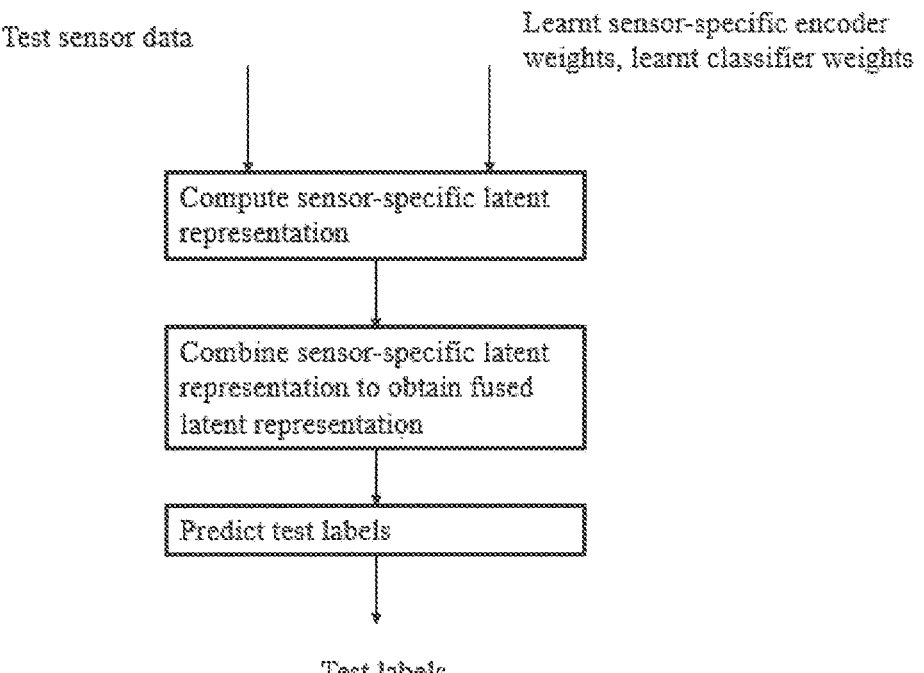
FIG. 3 is an exemplary block diagram illustrating a testing phase of the system for multi-sensor fusion in the presence of missing and noisy labels, in accordance with some embodiments of the present disclosure.

In a testing phase, the learnt sensor-specific encoder weights and the classifier weights are used for generating test labels. FIG. 3 is an exemplary block diagram illustrating the testing phase of the system 100 for multi-sensor fusion in the presence of missing and noisy labels, in accordance with some embodiments of the present disclosure. Sensor-specific latent representations are computed from the learnt sensor-specific encoder weights and further the sensor-specific latent representations are combined. The test labels are predicted using the combined sensor-specific latent representations and the classifier weights A detailed explanation of the block diagram is explained further with the help of FIG. 4A-4C.

FIG. 4A-4C is an exemplary flow diagram illustrating the method for multi-sensor fusion in the presence of missing and noisy labels in accordance with some embodiments of the present disclosure.

In an embodiment of the present disclosure, the one or more processors 102 are configured to receive at step 402, (i) a set of sensor data $(X_1, X_2, \ldots, X_n)$ from a set of sensors and (ii) class labels (Y) corresponding to the set of sensor data for learning the set of sensor-specific autoencoders for multi-sensor fusion wherein the class labels are one or more of partially labelled and noisy labelled. Learning the set of sensor-specific autoencoders involves a joint optimization of a set of parameters including (i) a set of sensor-specific encoder weights $(W_{e1}, \ldots, W_{en})$ (ii) a set of sensor-specific decoder weights $(W_{d1}, \ldots, W_{dn})$ (iii) a set of sensor-specific latent representations $(H_1, \ldots, H_n)$ corresponding to the set of sensor data (iv) a set of new class labels (F) and (v) a set of classifier weights (M).

In an embodiment of the present disclosure, the one or more processors 102 are configured to generate at step 404, a set of graphs corresponding to the set of sensor data. An individual graph is generated for each sensor data. Let $X_i = [x_{1i}, x_{2i}, \ldots, x_{Ni}] \in \mathbb{R}^{D_c \times N}$ denote the $i^{th}$ sensor data for i={1,2, . . . ,N} with N measurements in $D_c$ dimensional space, that belongs to K class labels. Given $i^{th}$ sensor data $X_i$, a k-nearest neighbor graph is constructed where two vertices p and q are connected by an edge, if the distance between p and q is among the $k^{th}$ smallest distances $(\mathcal{N}_p)$ from p to all other vertices in the graph p. Considering an undirected graph, the binary adjacency matrix is defined as:

$$A(p, q) = \begin{cases} 1, & \text{if } \|x_p - x_q\|_2^2 \in N_p \\ 0, & \text{otherwise} \end{cases} \quad (1)$$

where $$\|x_p - x_q\|_2^2$$

denotes the Euclidean distance between the $p^{th}$ and $q^{th}$ data points of sensor data $X_i$. In the similar way, graphs for all n sensor data are constructed with $A_1, A_2, \ldots, A_n$.

In an embodiment of the present disclosure, the one or more processors 102 are configured to generate at step 406, a fused adjacency matrix computed as, $$A_{fus} = A_1 \odot A_2 \odot \ldots \odot A_n \quad (2)$$

wherein "⊙" denotes element-wise multiplication. Thus $A_{fus}(p, q)=1$ only if $(p, q)^{th}$ entry of all $A_1, A_2, \ldots, A_n$ is 1 and 0 otherwise. To assign weights to the edges, pairwise distance A of the stacked matrix $X_{sta}=[X_1; X_2; \ldots; X_n]$ is computed where $X_{sta}$ is formed by stacking the individual sensor data $X_1$ to $X_n$. The fused distance matrix $A_{fus}$ for $X_{sta}$ is computed as $$\Lambda_{fus} = \Lambda + A_{fus}^{Neg} \max(\Lambda) \qquad (3)$$

where $$A_{fus}^{Neg}$$

denotes the logical negation matrix of $A_{fus}$. The weight matrix W is computed using a thresholded Gaussian kernel weighting function using the fused distance matrix $\Lambda_{fus}$. The normalized fused graph Laplacian (L) is computed using $L=D^{-0.5}*(D-W)*D^{-0.5}$ wherein D is a diagonal matrix computed as $$d(i, i) = \sum_{j=1}^{N} [W]_{i,j},$$

and $w_{i,j}$ is the weight of the edge connecting the vertices i and j. The fused graph captures the correlation between multi-sensor data to detect and estimate the unknown labels and noisy labels.

In an embodiment of the present disclosure, the one or more processors 102 are configured to iteratively learn at step 408, the set of sensor-specific autoencoders by jointly learning the set of parameters based on the joint optimization until a termination criteria is met. The joint optimization is represented as $$\min_{W_{d1},\ldots,W_{dn},W_{e1},\ldots,W_{en},H_1,\ldots,H_n,M,F} \|X_1 - W_{d1}H_1\|_F^2 + \qquad (4)$$

$$\|W_{e1}X_1 - H_1\|_F^2 + \ldots + \|X_n - W_{dn}H_n\|_F^2 + \|W_{en}X_n - H_n\|_F^2 +$$

$$\alpha Tr(FLF^T) + \beta Tr((F - Y)U(F - Y)^T) + \lambda\|F - MH\|_F^2$$

such that $H_1 \geq 0, \ldots, H_n \geq 0$. A Rectified Linear Unit (ReLU) type non-linearity is utilized in the network by putting the negative values of the latent representations to zero. $\alpha$, $\beta$ and $\lambda$ are real positive number parameters, U is a diagonal matrix with $U_{jj}=1$ when the $j^{th}$ measurement of the set of sensor data is labelled else $U_{jj}=0$. The parameters $\alpha$, $\beta$ and $\lambda$ control the tradeoffs among the regularization terms. The first and second term in equation (4) is common to all n sensors and is used to learn the sensor-specific encoder ($W_{ei} \in \mathbb{R}^{Q \times D_c}$), decoder ($W_{di} \in \mathbb{R}^{D_c \times Q}$), and latent representation ($H_i \in \mathbb{R}^{Q \times N}$) with Q number of hidden neurons for all $i=1,2,\ldots,n$ sensors. The graph regularization term $Tr(FLF^T)$ ensures the estimated labels F are in conformance and hence smooth with respect to the underlying fused graph L capturing the correlations of the multi-sensor data. The successive term ensures that a predicted label matrix F is close to the given class label matrix Y whenever the class labels are known.

The learning of the set of sensor-specific autoencoders is explained using the steps provided in FIG. 4C. The learning of the set of sensor-specific autoencoders comprises updating the set of sensor-specific encoder weights at step 408a. The set of sensor-specific encoder weights ($W_{ei}$) are updated and is represented as, $$W_{ei} \leftarrow \min_{W_{ei}}\|W_{ei}X_i - H_i\|_F^2 \qquad (5)$$

Further at step 408b, the learning of the set of sensor-specific autoencoders comprises updating the set of sensor-specific decoder weights. The updating of the set of sensor-specific decoder weights is represented as, $$W_{di} \leftarrow \min_{W_{di}}\|X_i - W_{di}H_i\|_F^2 \qquad (6)$$

At step 408c, the learning of the set of sensor-specific autoencoders comprises updating the set of sensor-specific latent representations wherein the updating of the set of sensor-specific latent representations is represented as, $$H_i \leftarrow \qquad (7)$$

$$\min_{H_i}\|X_i - W_{di}H_i\|_F^2 + \|W_{ei}X_i - H_i\|_F^2 + \lambda\left\|F - \left(M_iH_i + \sum_{z=1,z\neq i}^{n} M_zH_z\right)\right\|_F^2$$

such that $H_i \geq 0$.

Further at step 408d, the learning of the set of sensor-specific autoencoders comprises combining the set of sensor-specific latent representations to obtain the fused latent representation. The fused latent representation (H) is obtained based on a simple concatenation of the set of sensor-specific latent representations given as $$H = \begin{bmatrix} H_1 \\ \vdots \\ H_n \end{bmatrix} \qquad (8)$$

However, it may not be limited to simple concatenation, other methods such as weighted concatenation or a separate model/network can be utilized for combining $H_1, H_2, \ldots, H_n$.

The learning of the set of sensor-specific autoencoders at step 408e comprises estimating the set of new class labels (F) using the fused graph, the set of new class labels from a previous iteration, the class labels, the fused latent representation and the classifier weights. In the first iteration the set of new class labels are estimated using the fused graph and the class labels. The new class labels are estimated using the below representation, $$F \leftarrow \min_{F} \alpha Tr(FLF^T) + \beta Tr((F - Y)U(F - Y)^T + \lambda\|F - MH\|_F^2 \qquad (9)$$

Finally, the learning of the set of sensor-specific autoencoders at step 408e comprises updating the set of classifier weights using the set of new class labels and the fused latent representation. The set of classifier weights are updated using the representation as below, $$M \leftarrow \min_{M} \lambda \|F - MH\|_F^2 \tag{10}$$

The closed form updates for the sensor-specific encoder weights (equation (5)), decoder weights (equation (6)) and classifier weights (equation (10)) can be directly obtained using simple least squares. The update for the fused latent representation and the set of new class labels is obtained by expanding the representations in (equation (7)) and (equation (9)) in terms of trace, taking a derivative with respect to $H_i$ and F respectively, then equating it to 0. This provides a solution as given below, $$H_i = \left(W_{di}^T W_{di} + I + \lambda M_i^T M_i\right)^{-1} \cdot \tag{11}$$

$$\left(W_{di}^T X_i + W_{ei} X_i + \lambda \left(M_i^T F - M_i^T \sum_{z=1, z \neq i}^{n} M_z H_z\right)\right)$$

$$F = (\beta YU + \lambda MH)(\alpha L + \beta U + \lambda I)^{-1} \tag{12}$$

The set of sensor-specific encoder weights, decoder weights, latent representations, the set of new class labels and the classifier weights are learned iteratively until the termination criteria is met. The termination criteria is convergence of a loss function associated with the joint optimization within an empirically determined threshold value. The empirically determined threshold value is 0.01.

During the test phase, a set of test labels are predicted using the updated set of sensor-specific encoder weights and the learnt classifier weights. In an embodiment of the present disclosure, the one or more processors 102 are configured to provide at step 410, a set of test sensor data $$(X_1^{test}, X_2^{test}, \ldots, X_n^{test})$$

for predicting the set of test labels ($\hat{Y}_{test}$). In an embodiment of the present disclosure, the one or more processors 102 are configured to compute at step 412, a set of sensor-specific test latent representations $$(H_1^{test}, \ldots, H_n^{test})$$

corresponding to the set of test sensor data using the updated set of sensor-specific encoder weights. The test latent representation for the $i^{th}$ sensor is expressed as, $$H_i^{test} = W_{ei} X_i^{test} \tag{13}$$

In an embodiment of the present disclosure, the one or more processors 102 are configured to combine at step 414, the set of sensor-specific test latent representations $$(H_1^{test}, \ldots, H_n^{test})$$

to obtain a fused test latent representation ($H_{test}$). All the test latent representations are stacked together to generate the common features given as, $$H_{test} = [H_1^{test}, \ldots, H_n^{test}]^T \tag{14}$$

In an embodiment of the present disclosure, the one or more processors 102 are configured to predict at step 416, the set of test labels ($\hat{Y}_{test}$) using the fused test latent representations and the learnt set of classifier weights (M). The set of test labels are estimated as, $$\hat{Y}_{test} = MH_{test} \tag{15}$$

EXPERIMENTAL RESULTS: The performance of the disclosed GAF technique is validated for classification task on a publicly available gearbox fault dataset. As the dataset consists only noise free labels, the training set is corrupted with different percentage of noisy labels for experimentation purpose to evaluate the efficacy for supervised and semi-supervised fusion methods. The generation of noisy labels is done by randomly flipping the true labels of one class into another class.

The effectiveness of the disclosed method is shown by comparing it with state-of-the-art methods i.e., AutoFuse (AF) and Label propagation with AutoFuse (LpAF). AF performs better than deep learning methods with reduce model complexity, this method is used as a baseline for comparison. In LpAF, the graph regularized term is combined with the autoencoder based fusion framework and only unknown labels are predicted by utilizing the known labels. The classification accuracy for each of the method is defined as (NC/NT)×100%, where NC is the number of correctly classified test samples of an algorithm and NT is the total number of test samples. In the current experiment, relevant features are extracted from the time series data and fed to each method for fair comparison. For GAF algorithm, the value of hyperparameter $\alpha$, $\beta$ and $\lambda$ is tuned by searching the grid {0.1, 1, 2, 4, 6, 8, 10} in an alternate way, and the best configuration is utilized to present the results.

Gearbox fault dataset is collected by conducting the experiment using Drivetrain Dynamic Simulator (DDS) which is composed of a motor, planetary and parallel gearbox, and brake controller. In the experiment, gear faults are investigated at 30 $H_z$ rotating speed with 2V loading configuration. The experimental setup consists of eight sensors; Six of them measure the vibrations of the planetary and parallel gearbox in x, y and z directions and the remaining two sensors measure the motor vibration and torque. The data from six vibration sensors connected to the two gearboxes is considered here for classification task. A five-class classification is carried out to detect four faulty and one healthy gearbox state. The four fault categories are: (i) chipped tooth, (ii) missing tooth, (iii) root fault and (iv) surface fault.

Now, the time-domain features (RMS and variance) are extracted from raw data over a window of 20 seconds. These features are considered as an input for weighted graph construction and latent representations learning of autoencoders in the disclosed method. Two single layer autoencoders are trained, where features obtained from the sensors connected to planetary gearbox are fed to the first autoencoder and in a similar way, features obtained from the sensors connected to parallel gearbox are fed to the second autoencoder. The binary adjacency matrix $A_1$ and $A_2$ is computed using the features corresponding to planetary and parallel gearboxes respectively, and the weight matrix W is obtained by utilizing the fused distance matrix $\Lambda_{fus}$. Now, the graph Laplacian matrix L is used for label propagation and correction while learning the latent representations. For the LpAF and the disclosed GAF, the value of k in k-NN graph is set as 40 and the value of threshold in Gaussian kernel weighting function is set as 0.4. The dimension of latent representation is searched from the set {4, 5, 6, 7, 8, 9} and it is same for both autoencoders. Then, the common feature space is obtained by combining the latent representation of each autoencoder which is later used for fault detection and classification.

Table 1 presents the classification accuracy for supervised and Table 2 and Table 3 presents semi-supervised learning (with 10% and 30% labeled data) methods when the percentage of noisy labels in the training data is set at 0%, 20%, 30%, 40% and 50% of labeled data. Five-fold Cross-Validation (CV) is carried out to generate the results. The LpAF method is specially used to address semi-supervised scenario, so the results are presented only for partially annotated data with noisy labels. From these tables, it can be observed that the accuracy of the AF method is decreasing with increase in % of noisy labels from 20% to 50%. The reason for this decline is that the labels prediction and correction are not considered for AF in the joint optimization formulation. It is observed that the performance of GAF method is better than the other two methods. It can be seen that AF method performs well when data is fully or partially labelled with no noisy labels and its performance reduces when noisy labels are present in data. This is because it does not have capability to do label propagation and correction. On the other hand, LpAF method performs well for semi-supervised case because it can use fused geometric structure of sensor data for label propagation. The performance of the GAF method is always better than AF and LpAF methods due to compact representation learning of sensor data by combining fused graph structure and label information of the input data.

TABLE 1

| | Supervised (100% annotated data) | | | | |
|---|---|---|---|---|---|
| Methods | 0% Noisy labels | 20% Noisy labels | 30% Noisy labels | 40% Noisy labels | 50% Noisy labels |
| AF | 0.976 | 0.916 | 0.880 | 0.860 | 0.772 |
| LpAF | — | — | — | — | — |
| GAF | 0.976 | 0.976 | 0.980 | 0.980 | 0.972 |

TABLE 2

| | Semi-Supervised (10% annotated data) | | | | |
|---|---|---|---|---|---|
| Methods | 0% Noisy labels | 20% Noisy labels | 30% Noisy labels | 40% Noisy labels | 50% Noisy labels |
| AF | 0.864 | 0.788 | 0.664 | 0.588 | 0.552 |
| LpAF | 0.980 | 0.936 | 0.920 | 0.852 | 0.800 |
| GAF | 0.988 | 0.980 | 0.984 | 0.948 | 0.860 |

TABLE 3

| | Semi-Supervised (30% annotated data) | | | | |
|---|---|---|---|---|---|
| Methods | 0% Noisy labels | 20% Noisy labels | 30% Noisy labels | 40% Noisy labels | 50% Noisy labels |
| AF | 0..968 | 0.852 | 0.792 | 0.753 | 0.644 |
| LpAF | 0.990 | 0.940 | 0.908 | 0.896 | 0.860 |
| GAF | 0.992 | 0.984 | 0.992 | 0.988 | 0.956 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:

receiving, via one or more hardware processors, (i) a set of sensor data ($X_1$, $X_2$, . . . , $X_n$) from a set of sensors and (ii) class labels (Y) corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights ($W_{e1}$, . . . , $W_{en}$) (ii) a set of sensor-specific decoder weights ($W_{d1}$, . . . , $W_{dn}$) (iii) a set of sensor-specific latent representations ($H_1$, . . . , $H_n$) corresponding to the set of sensor data (iv) a set of new class labels (F) and (v) a set of classifier weights (M), wherein the class labels are one or more of partially labelled and noisy labelled;

generating, via the one or more hardware processors, a set of graphs corresponding to the set of sensor data wherein a graph amongst the set of graphs corresponds to at most one sensor data from the set of sensors;

generating, via the one or more hardware processors, a fused graph (L) from the set of graphs;

iteratively learning, via the one or more hardware processors, the set of sensor-specific autoencoders by jointly learning the set of parameters based on the joint optimization until a termination criteria is met, the learning comprises, updating, via the one or more hardware processors, the set of sensor-specific encoder weights;

updating, via the one or more hardware processors, the set of sensor-specific decoder weights;

updating, via the one or more hardware processors, the set of sensor-specific latent representations;

combining, via the one or more hardware processors, the set of sensor-specific latent representations to obtain the fused latent representation;

estimating, via the one or more hardware processors, the set of new class labels (F) using the fused graph, the set of new class labels from a previous iteration, the class labels, the fused latent representation and the classifier weights; and updating, via the one or more hardware processors, the set of classifier weights using the set of new class labels and the fused latent representation;

providing, via the one or more hardware processors, a set of test sensor data $$(X_1^{test}, X_2^{test}, \ldots, X_n^{test})$$

for predicting a set of test labels ($\hat{Y}_{test}$);

computing, via the one or more hardware processors, a set of sensor-specific test latent representations $$(H_1^{test}, \ldots, H_n^{test})$$

corresponding to the set of test sensor data using the updated set of sensor-specific encoder weights;

combining, via the one or more hardware processors, the set of sensor-specific test latent representations $$(H_1^{test}, \ldots, H_n^{test})$$

to obtain a fused test latent representation ($H_{test}$); and predicting, via the one or more hardware processors, the set of test labels ($\hat{Y}_{test}$) using the fused test latent representations and the learnt set of classifier weights (M);

wherein the joint optimization is represented as, $$\min_{W_{d1},\ldots,W_{dn},W_{e1},\ldots,W_{en},H_1,\ldots,H_n,M,F} \|X_1 - W_{d1}H_1\|_F^2 +$$
$$\|W_{e1}X_1 - H_1\|_F^2 + \ldots + \|X_n - W_{dn}H_n\|_F^2 + \|W_{en}X_n - H_n\|_F^2 +$$
$$\alpha Tr(FLF^T) + \beta Tr((F-Y)U(F-Y)^T) + \lambda\|F - MH\|_F^2$$

such that $H_1 \geq 0$, . . . , $H_n \geq 0$, where $\alpha$, $\beta$ and $\lambda$ are real positive number parameters, U is a diagonal matrix with $U_{jj}=1$ when the $j^{th}$ measurement of the set of sensor data is labelled else $U_{jj}=0$.

2. The method as claimed in claim 1, wherein estimating the set of new class labels in a first iteration utilizes the fused graph and the class labels.

3. The method as claimed in claim 1, wherein updating the set of sensor-specific latent representations is represented as, $$H_i \leftarrow \min_{H_i}\|X_i - W_{di}H_i\|_F^2 + \|W_{ei}X_i - H_i\|_F^2 + \lambda\left\|F - \left(M_iH_i + \sum_{z=1,z\neq i}^{n} M_zH_z\right)\right\|_F^2$$

such that $H_i \geq 0$.

4. The method as claimed in claim 1, wherein obtaining the fused latent representation (H) is based on simple concatenation of the set of sensor-specific latent representations.

5. The method as claimed in claim 1, wherein estimating the new class labels (F) is represented as, $$F \leftarrow \min_{F} \alpha Tr\left(FLF^T\right) + \beta Tr\left((F - Y)U(F - Y)^T\right) + \lambda \|F - MH\|_F^2.$$

6. The method as claimed in claim 1, wherein updating the set of classifier weights (M) is represented as, $$M \leftarrow \min_{M} \lambda \|F - MH\|_F^2.$$

7. The method as claimed in claim 1, wherein the termination criteria is convergence of a loss function associated with the joint optimization within an empirically determined threshold value.

8. A system comprising:

a memory storing instructions;

one or more communication interfaces; and one or more hardware processors coupled to the memory via the one or more communication interfaces, wherein the one or more hardware processors are configured by the instructions to:

receive (i) a set of sensor data $(X_1, X_2, \ldots, X_n)$ from a set of sensors and (ii) class labels (Y) corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights $(W_{e1}, \ldots, W_{en})$ (ii) a set of sensor-specific decoder weights $(W_{d1}, \ldots, W_{dn})$ (iii) a set of sensor-specific latent representations $(H_1, \ldots, H_n)$ corresponding to the set of sensor data (iv) a set of new class labels (F) and (v) a set of classifier weights (M), wherein the class labels are one or more of partially labelled and noisy labelled;

generate a set of graphs corresponding to the set of sensor data wherein a graph amongst the set of graphs corresponds to at most one sensor data from the set of sensors;

generate a fused graph (L) from the set of graphs;

iteratively learn the set of sensor-specific autoencoders by jointly learning the set of parameters based on the joint optimization until a termination criteria is met, the learning comprises, updating the set of sensor-specific encoder weights;

updating the set of sensor-specific decoder weights;

updating the set of sensor-specific latent representations;

combining the set of sensor-specific latent representations to obtain the fused latent representation;

estimating the set of new class labels (F) using the fused graph, the set of new class labels from a previous iteration, the class labels, the fused latent representation and the classifier weights; and updating the set of classifier weights using the set of new class labels and the fused latent representation;

provide a set of test sensor data $$(X_1^{test}, X_2^{test}, \ldots, X_n^{test})$$

for predicting a set of test provide a set of test sensor data labels $(\hat{Y}_{test})$;

compute a set of sensor-specific test latent representations $$(H_1^{test}, \ldots, H_n^{test})$$

corresponding to the set of test sensor data using the updated set of sensor-specific encoder weights;

combine the set of sensor-specific test latent representations $$(H_1^{test}, \ldots, H_n^{test})$$

to obtain a fused test latent representation $(H_{test})$; and predict the set of test labels $(\hat{Y}_{test})$ using the fused test latent representations and the learnt set of classifier weights (M);

wherein the joint optimization is represented as, $$\min_{W_{d1}, \ldots, W_{dn}, W_{e1}, \ldots, W_{en}, H_1, \ldots, H_n, M, F} \|X_1 - W_{d1}H_1\|_F^2 +$$
$$\|W_{e1}X_1 - H_1\|_F^2 + \ldots + \|X_n - W_{dn}H_n\|_F^2 + \|W_{en}X_n - H_n\|_F^2 +$$
$$\alpha Tr\left(FLF^T\right) + \beta Tr\left((F - Y)U(F - Y)^T\right) + \lambda \|F - MH\|_F^2$$

such that $H_1 \geq 0, \ldots, H_n \geq 0$, where $\alpha$, $\beta$ and $\lambda$ are real positive number parameters, U is a diagonal matrix with $U_{ii} = 0$ when the $i^{th}$ measurement of the set of sensor data is labelled else $U_{ii} = 0$.

9. The system as claimed in claim 8, wherein the one or more hardware processors are configured to estimate the set of new class labels in the first iteration utilizes the fused graph and the class labels.

10. The system as claimed in claim 8, wherein the one or more hardware processors are configured to update the set of sensor-specific latent representations is represented as, $$H_i \leftarrow \min_{H_i} \|X_i - W_{di}H_i\|_F^2 + \|W_{ei}X_i - H_i\|_F^2 + \lambda \left\|F - \left(M_iH_i + \sum_{z=1, z \neq i}^{n} M_zH_z\right)\right\|_F^2$$

such that $H_i \geq 0$.

11. The system as claimed in claim 8, wherein the one or more hardware processors are configured to obtain the fused latent representation (H) is based on simple concatenation of the set of sensor-specific latent representations.

12. The system as claimed in claim 8, wherein the one or more hardware processors are configured to estimate the new class labels (F) is represented as, $$F \leftarrow \min_{F} \alpha Tr\left(FLF^T\right) + \beta Tr\left((F - Y)U(F - Y)^T\right) + \lambda \|F - MH\|_F^2.$$

13. The system as claimed in claim 8, wherein the one or more hardware processors are configured to update the set of classifier weights (M) is represented as, $$M \leftarrow \min_{M} \lambda \|F - MH\|_F^2.$$

14. The system as claimed in claim 8, wherein the termination criteria is convergence of a loss function associated with the joint optimization within an empirically determined threshold value.

15. One or more non-transitory machine-readable information storage mediums comprising one or more instructions which when executed by one or more hardware processors cause:

receiving (i) a set of sensor data $(X_1, X_2, \ldots, X_n)$ from a set of sensors and (ii) class labels (Y) corresponding to the set of sensor data for learning a set of sensor-specific autoencoders for multi-sensor fusion wherein learning the set of sensor-specific autoencoders involves a joint optimization of a set of parameters including (i) a set of sensor-specific encoder weights $(W_{e1}, \ldots, W_{en})$ (ii) a set of sensor-specific decoder weights $(W_{d1}, \ldots, W_{dn})$ (iii) a set of sensor-specific latent representations $(H_1, \ldots, H_n)$ corresponding to the set of sensor data (iv) a set of new class labels (F) and (v) a set of classifier weights (M), wherein the class labels are one or more of partially labelled and noisy labelled;

generating a set of graphs corresponding to the set of sensor data wherein a graph amongst the set of graphs corresponds to at most one sensor data from the set of sensors;

generating a fused graph (L) from the set of graphs;

iteratively learning the set of sensor-specific autoencoders by jointly learning the set of parameters based on the joint optimization until a termination criteria is met, the learning comprises, updating the set of sensor-specific encoder weights;

updating the set of sensor-specific decoder weights;

updating the set of sensor-specific latent representations;

combining the set of sensor-specific latent representations to obtain the fused latent representation;

estimating the set of new class labels (F) using the fused graph, the set of new class labels from a previous iteration, the class labels, the fused latent representation and the classifier weights; and updating the set of classifier weights using the set of new class labels and the fused latent representation;

providing a set of test sensor data $$(X_1^{test}, X_2^{test}, \ldots, X_n^{test})$$

for predicting a set of test labels $(\hat{Y}_{test})$;

computing, via the one or more hardware processors, a set of sensor-specific test latent representations $$(H_1^{test}, \ldots, H_n^{test})$$

corresponding to the set of test sensor data using latent representations the updated set of sensor-specific encoder weights;

combining the set of sensor-specific test latent representations $$(H_1^{test}, \ldots, H_n^{test})$$

to obtain a fused test latent representation $(H_{test})$; and predicting the set of test labels $(\hat{Y}_{test})$ using the fused test latent representations and the learnt set of classifier weights (M);

wherein the joint optimization is represented as, $$\min_{W_{d1}, \ldots, W_{dn}, W_{e1}, \ldots, W_{en}, H_1, \ldots, H_n, M, F} \|X_1 - W_{d1}H_1\|_F^2 +$$
$$\|W_{e1}X_1 - H_1\|_F^2 + \ldots + \|X_n - W_{dn}H_n\|_F^2 + \|W_{en}X_n - H_n\|_F^2 +$$
$$\alpha Tr(FLF^T) + \beta Tr((F - Y)U(F - Y)^T) + \lambda\|F - MH\|_F^2$$

such that $H_1 \geq 0, \ldots, H_n \geq 0$, where $\alpha$, $\beta$ and $\lambda$ are real positive number parameters, U is a diagonal matrix with $U_{jj} = 1$ when the $i^{th}$ measurement of the set of sensor data is labelled else $U_{jj} = 0$.

\* \* \* \* \*